(12) United States Patent
Steele

(10) Patent No.: US 12,000,384 B2
(45) Date of Patent: *Jun. 4, 2024

(54) FLOW CONTROL FOR GEOTHERMAL WELL

(71) Applicant: Halliburton Energy Services, Inc., Houston, TX (US)

(72) Inventor: David Joe Steele, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,822

(22) Filed: Jan. 24, 2023

(65) Prior Publication Data
US 2023/0160373 A1    May 25, 2023

Related U.S. Application Data

(63) Continuation of application No. 17/488,907, filed on Sep. 29, 2021, now Pat. No. 11,585,330.

(51) Int. Cl.
*F03G 4/00* (2006.01)
*E21B 34/06* (2006.01)
(Continued)

(52) U.S. Cl.
CPC .............. *F03G 4/072* (2021.08); *E21B 34/06* (2013.01); *E21B 34/08* (2013.01); *E21B 43/12* (2013.01);
(Continued)

(58) Field of Classification Search
CPC ...... F03G 7/04; F03G 7/045; F03G 4/00–074; F24T 10/20; F24T 2010/56; E21B 34/06;
(Continued)

(56) References Cited

U.S. PATENT DOCUMENTS

| 6,490,916 B1 | 12/2002 | Goodwin et al. |
| 7,032,675 B2 | 4/2006 | Steele et al. |

(Continued)

FOREIGN PATENT DOCUMENTS

| CN | 105840146 | 4/2016 |
| WO | 2015-175142 | 11/2015 |

OTHER PUBLICATIONS

Banerjee, Sudiptya; Hascakir, Berna (2017). Design of flow control devices in steam-assisted gravity drainage (SAGD) completion. Journal of Petroleum Exploration and Production Technology.

(Continued)

*Primary Examiner* — Laert Dounis
(74) *Attorney, Agent, or Firm* — Scott Richardson; C. Tumey Law Group PLLC

(57) ABSTRACT

Systems and methods for harvesting geothermal energy use temperature-based flow control to optimize the extraction of thermal energy from a geothermal reservoir. In one example, a thermal transport fluid is flowed into a wellbore traversing a thermal reservoir of a formation. Flow of the thermal transport fluid into and out of the thermal reservoir is dynamically controlled at each of a plurality of injection and/or return locations in response to a downhole parameter such as temperature. For example, flow may be controlled so that the flow into the thermal reservoir is greater at the injection locations where the temperature is hotter and that the flow out of the thermal reservoir is greater at the return locations where the temperature is hotter. The thermal transport fluid produced from the return locations is then conveyed to surface to extra the thermal energy.

20 Claims, 5 Drawing Sheets

(51) Int. Cl.
| | |
|---|---|
| *E21B 34/08* | (2006.01) |
| *E21B 43/12* | (2006.01) |
| *E21B 43/17* | (2006.01) |
| *E21B 47/07* | (2012.01) |
| *F03G 4/02* | (2006.01) |
| *F24T 10/00* | (2018.01) |
| *F24T 10/20* | (2018.01) |

(52) U.S. Cl.
CPC ............... *E21B 43/17* (2013.01); *F03G 4/02* (2021.08); *F24T 10/20* (2018.05); *E21B 47/07* (2020.05); *E21B 2200/06* (2020.05); *F24T 2010/56* (2018.05); *Y02E 10/10* (2013.01)

(58) Field of Classification Search
CPC ...... E21B 34/08; E21B 2200/06; E21B 47/07; E21B 43/14; E21B 43/17
See application file for complete search history.

(56) References Cited

U.S. PATENT DOCUMENTS

| | | | |
|---|---|---|---|
| 7,866,400 | B2 | 1/2011 | Steele et al. |
| 8,096,362 | B2 | 1/2012 | Steele et al. |
| 8,839,857 | B2 | 9/2014 | Schultz et al. |
| 8,910,714 | B2 | 12/2014 | Tardy et al. |
| 8,991,510 | B2 | 3/2015 | Saar et al. |
| 9,726,157 | B2 | 8/2017 | Sweatman et al. |
| 10,267,129 | B1 | 4/2019 | Sun et al. |
| 11,585,330 | B1 * | 2/2023 | Steele ............... F03G 4/02 |
| 2005/0072578 | A1 | 4/2005 | Steele et al. |
| 2007/0284118 | A1 | 12/2007 | Benton |
| 2010/0269501 | A1 | 10/2010 | Parrella |
| 2010/0307756 | A1 | 12/2010 | Jung et al. |
| 2011/0073295 | A1 | 3/2011 | Steele et al. |
| 2012/0160496 | A1 | 6/2012 | Tardy et al. |
| 2015/0300327 | A1 | 10/2015 | Sweatman et al. |
| 2017/0130703 | A1 | 5/2017 | Muir et al. |
| 2017/0247990 | A1 | 8/2017 | Bahorich |
| 2021/0254438 | A1 | 8/2021 | Sun et al. |
| 2021/0278106 | A1 | 9/2021 | O'Malley et al. |

OTHER PUBLICATIONS

Enhanced Geothermal Systems (EGS) Well Construction Technology Evaluation Report, Sandia Report, SAND2008-7866 Unlimited Release Printed Dec. 2008.

Flow Performance of the Habanero EGS Closed Loop, Proceedings World Geothermal Congress 2015 Melbourne, Australia, Apr. 19-25, 2015.

Stalder, John (2013). Test of SAGD Flow-Distribution-Control Liner System in the Surmont Field, Alberta, Canada. Journal of Canadian Petroleum Technology, 52(2), 95-100. SPE-153706-MS.

Vachon, G. P.; Klaczek, W.; Erickson, P. J.; Langer, D. C.; Booy, D.; Baugh, A. ( ). [Society of Petroleum Engineers SPE Canada Heavy Oil Technical Conference—Calgary, Alberta, Canada (Jun. 9, 2015)] SPE Canada Heavy Oil Technical Conference—Use of Flow Control Devices (FCDs) to Enforce Conformance in Steam Assisted Gravity Drainage (SAGD) Completions.

SGP-TR-198, Ja Pogacnik, et al., CGS, Controlled Wellbore-to-Wellbore Geothermal System Flow, Nov. 2013.

Fripp, Michael; Zhao, Liang; Least, Brandon ( ). [Society of Petroleum Engineers SPE Middle East Intelligent Energy Conference and Exhibition—Manama, Bahrain (Oct. 28, 2013)] SPE Middle East Intelligent Energy Conference and Exhibition—The Theory of a Fluidic Diode Autonomous Inflow Control Device.

International Search Report and Written Opinion for Application No. PCT/US2021/056556, dated Jun. 16, 2022.

Office Action Summary for U.S. Appl. No. 17/488,307 dated Jul. 14, 2022.

Notice of allowance for U.S. Appl. No. 17/488,907 dated Oct. 21, 2022.

* cited by examiner

FLOW CONTROL FOR GEOTHERMAL WELL

CROSS-REFERENCE TO RELATED APPLICATIONS

This application is a continuation of U.S. patent application Ser. No. 17/488,907, filed Sep. 29, 2021, which is incorporated by reference in its entirety.

BACKGROUND

The energy industry continually strives to supplement existing, well-developed energy resources and technologies, such as by developing emerging energy sources and discovering new energy sources. These supplemental forms of energy may be useful, both to provide redundant energy and power system in the short term and to increase energy availability and reliability in the longer-term. So-called "alternative" energy sources, including those that are not so economically viable today, may also be phased in over a long time scale as other resources gradually deplete.

One area of robust development is in geothermal energy production. Geothermal energy production is a way to harvest existing energy in the form of heat inside the earth (geothermal energy) and converting that thermal energy into other forms of useful energy. Geothermal energy production systems have been constructed in an effort to extract thermal energy below ground and convert it to electricity.

Globally, it has been speculated that significant levels of geothermal power can be generated using closed-loop geothermal systems that exploit hot and deep geothermal resources. While these systems can be commercialized in some locations presently, the industry generally seeks improvements in well construction technology to broaden the range of projects that can be more economically viable. Such improvements may include, for example, efforts to reduce the cost of drilling, improving materials, and advancing well completion systems used to harvest geothermal energy.

BRIEF DESCRIPTION OF THE DRAWINGS

These drawings illustrate certain aspects of some of the embodiments of the present disclosure and should not be used to limit or define the method.

DETAILED DESCRIPTION

Figure 1:
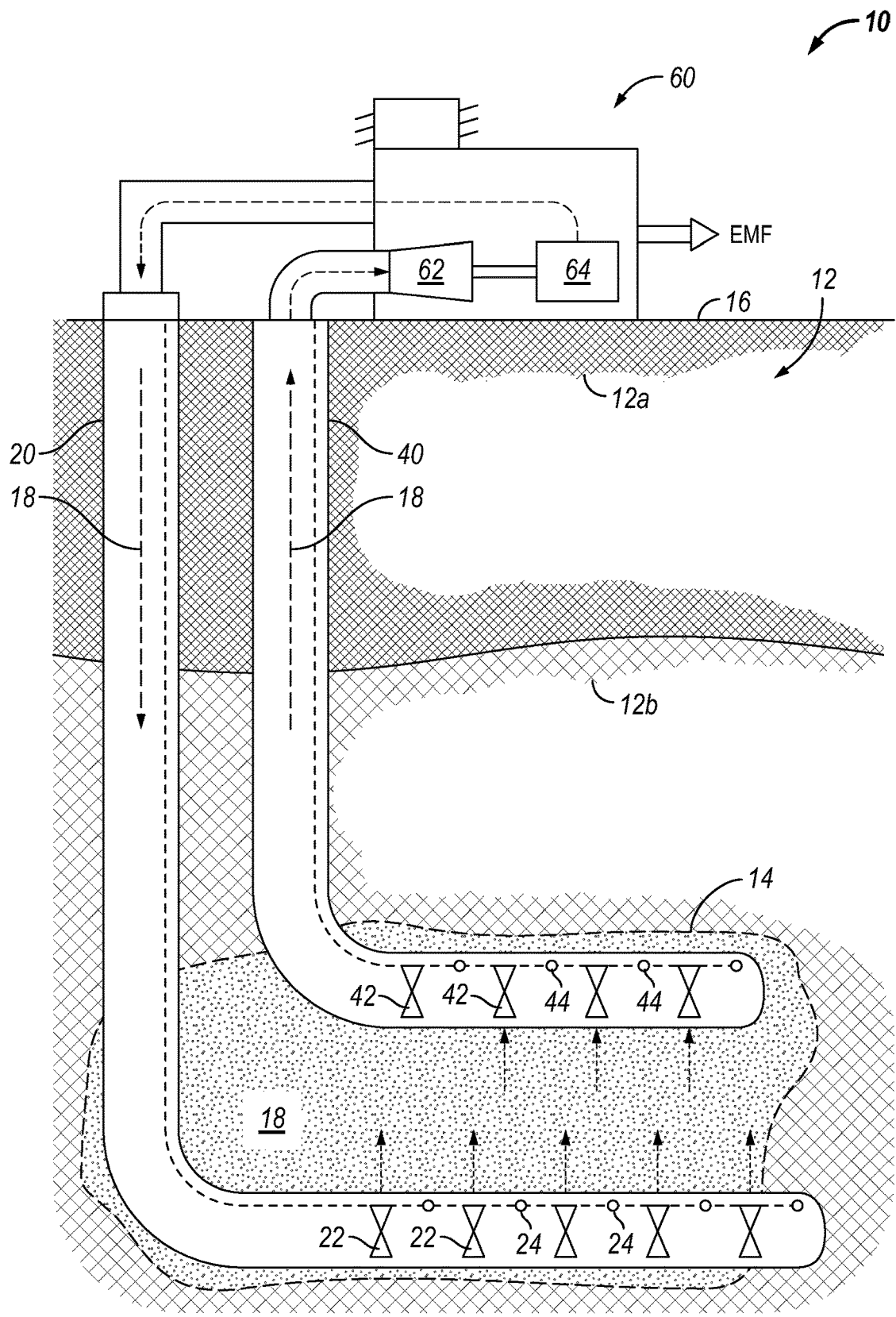
FIG. 1 is an elevation view of a geothermal energy production system according to a first example configuration having a separate injection well and return well.

Disclosed herein are systems and methods for harvesting geothermal energy from an underground geothermal reservoir (alternately referred to herein as simply "thermal reservoir"). Aspects include optimizing flow between the thermal reservoir and surface to maximize energy extraction at a surface of a well site. The disclosed principles may be applied to any of a wide variety of thermal energy extraction. By way of illustration, example embodiments below discuss thermoelectric power generation, such as by using a thermoelectric generator. However, energy may be extracted using any of a variety of systems and for a variety of purposes. Other examples of extracting and utilizing thermal energy include heating a building or a green house, extraction of "process heat" used in industrial processes, such as manufacturing processes which require mixing of chemicals at elevated temperatures, and co-generation. The extracted energy may be useful across a broad spectrum of industries, including food and beverages, textiles, machinery industries, chemical industries, as well as agriculture and domestic/household type uses.

The disclosed systems and methods may control flow to and/or from a plurality of injection and return locations along a reservoir in relation to a downhole parameter of the thermal transport fluid, such as temperature, pressure, volume, heat, flow, velocity, isothermal changes, isobaric changes, isochoric changes, phase change, acoustic, vibration, distributed sensing (distributed temperature sensing (DTS), distributed acoustic sensing (DTS), distributed pressure sensing (DPS), and other parameters that may be measured via extrinsic sensors and/or intrinsic sensors, etc.) or pH, as non-limiting examples. In some embodiments, these systems and methods may implement temperature-based flow control to and from a thermal reservoir to improve the recovery of thermal energy, such as to optimize efficiency or rate of energy production. Temperature-based flow control may be based on temperature measurements. Where temperature sensors are used, the temperature sensors may be sufficiently spaced from the injection or return locations (e.g., away from the valves) so as to not to introduce an adverse feedback loop analogous to an air-conditioning unit blower blowing on the thermostat. Temperature-based flow control may alternatively rely, at least in part, on other parameters related to temperature, such as pressure and volume are related to temperature according to the Ideal Gas Law. In one example, the systems and methods may ensure a thermal transport fluid (gas, liquid, or combination of both) is injected into and flows out from hotter portions of the geothermal zone occupied by the thermal reservoir to improve efficiency. The flow of the thermal transport fluid between surface and the thermal reservoir may be along one or more wells, of which various example configurations are shown. The flow may be facilitated by one or more pumps. Alternatively, flow may be facilitated by thermosiphoning, which is based on natural convection to circulate a fluid without the necessity of a mechanical pump.

In some examples, the system and method may involve the use of injection valves for controlling the flow of thermal transport fluid into the thermal reservoir and a plurality of return valves for controlling the flow of the thermal transport fluid out of the thermal reservoir. The valves can be, for example, inflow control valves (ICVs) and/or thermostatic control valves (TCVs). In some configurations, the valves may be autonomous to provide automatic, temperature-based flow control, optionally using mechanical means. In other examples, a controller comprising a central controller and/or a plurality of local controllers may be in communication with temperature sensors to control flow at the injection and return valves in relation to temperature. In any of these examples flow may be individually, dynamically adjusted at each injection and return valve to ensure that flow is greater to hotter injection and locations than to corresponding cooler injection and return locations.

In other examples, the flows may be adjusted and/or regulated based upon other parameters than injecting and/or returning fluid into and/or from the hottest locations. For example, it may be desirable for the temperature of the return fluid to be lowered, hence a flow from a combination of higher and lower temperature zones may be combined to provide the desired return fluid temperature at the surface. In other examples, the TCV may incorporate pressure sensors, or other sensors (pH, sonic, e.g., fiber optic sonic or sensing fiber, flow sensors, mass sensors, mass-flow rate sensors, venturi, seismic, pH, fiber-optic sensors (intrinsic sensors and/or extrinsic sensors), etc.

FIG. 1 is an elevation view of a geothermal energy production system 10 according to a first example configuration having a separate injection well 20 and return well 40. The system 10 is constructed at a site of an underground formation 12 having any number of earthen formation layers or strata, e.g., 12a, 12b, and an underground thermal reservoir 14 deep below a surface 16 of the earth. The thermal reservoir 14 may comprise a region wherein temperatures are very hot and where the strata 12b is relatively fluid permeable. The permeability of the formation 12 may allow a large amount of a thermal transport fluid 18 to be stored in the thermal reservoir 14, that is continually heated by the surrounding formation 12 in the vicinity of the thermal reservoir 14. The system 10 is used to circulate heated thermal transport fluid 18 from the thermal reservoir 14 to the surface 16 for extracting thermal energy from the thermal transport fluid before reinjecting the thermal transport fluid into the geothermal reservoir 14. For discussion purposes, the energy extraction in these examples involves generating electricity, as part of a thermo-electric power generating cycle. However, capabilities of the system 10 may also include other flow and thermal control such as thermal recovery, and may be applied to any form of energy extraction.

Generally, a thermal transport fluid is a fluid (e.g., a gas or liquid) that participates in heat transfer by serving as an intermediary in heating on one side of a process, transporting and storing thermal energy, and cooling on another side of the process. In the example of FIG. 1, the thermal transport fluid 18 is heated in the vicinity of the thermal reservoir 14, then transports the heated fluid to the surface, where the heat is extracted for energy conversion. Water is a common heat transfer fluid because of its economy, high heat capacity and favorable transport properties. For higher temperatures, oil or synthetic hydrocarbon or silicone based fluids offer lower vapor pressure. Gases such as water vapor, nitrogen, argon, helium and hydrogen have been used as heat transfer fluids where liquids are not suitable. Supercritical fluids such as carbon dioxide are also suitable as a heat transfer fluid. For example, supercritical $CO_2$ can provide large compressibility and expansivity, which can facilitate a thermosiphon, whereby the thermal transport fluid is circulated with less or no reliance on mechanical pumping.

The thermal reservoir 14 may be hot, dry rock with appreciably no native fluids; or, the thermal reservoir 14 may have an existing, naturally occurring reserve of fluids, such as water and/or hydrocarbon fluids like oil and gas, which permeate the formation 12. Typically, however, the size and/or capacity of the thermal reservoir 14 may be increased by injecting additional, non-native fluid supplied from the surface 16 (e.g. water or supercritical $CO_2$) over a period of time (e.g., days or weeks) until there is a sufficient volume of thermal transport fluid 18 that is sufficiently heated by the formation 12 to economically drive thermoelectric power generation.

In some cases, a system may be defined wherein the thermal reservoir is not exclusively comprised only of naturally-occurring geological reservoir elements. A thermal reservoir may include a volume in the vicinity of a heat-containing geological formation having a capacity to store thermal energy. For example, a thermal reservoir may be defined to include a tube (e.g., a casing used to reinforce a wellbore) that may accept and hold heat and transfer heat. In another embodiment, the area between the casing and wellbore may be an element of a thermal reservoir. In a related embodiment, a thermal reservoir may include a casing-wellbore annulus and the volume/area inside the casing may be considered a thermal reservoir. A thermal reservoir may be a fixed volume or a volume/area that changes. A thermal reservoir may have boundaries that change. For example, a thermal reservoir may consists of one set of boundaries and then a change in boundaries may change to increase/decrease the size, shape, or other characteristic of the thermal reservoir. As another example, a thermal reservoir may consist of the area between two isolation packers with a permeability of 10 millidarcy and porosity of 12%. In another instance the thermal reservoir may change due to additional pressure being applied to force the thermal transport fluid out into a larger volume of the formation (rock, etc.). Thus, the thermal reservoir may be any of a variety of configurations of a space capable of storing thermal energy and also changing temperature by energy-transfer to (or from) another body (conduction) or fluid (convention) or radiation, or any combination thereof. Also thermal transfer due to other sources) such as heat from the core of the earth, etc.

The system 10 in this example includes a separate injection well 20 and return well 40 drilled into the formation down to the thermal reservoir 14. The system also includes an electric generator 60 installed at the surface 16 of the site. The injection well 20, return well 40, and generator 60 may form a closed loop fluid path for circulating the thermal transport fluid 18 as part of a thermo-electric power generating cycle. The thermal transport fluid 18 is continually flowed from the thermal reservoir 14 to the surface 16 via the return well 40 to have its thermal energy converted to electricity by the generator 60. The thermal transport fluid 18 is cooled by virtue of extracting the thermal energy. The cooled thermal transport fluid 18 is then reinjected into the thermal reservoir 14 via the injection well 20 to be reheated. This thermoelectric power cycle continues indefinitely, drawing thermal energy from the earth and converting it to another form of energy such as electricity at the surface 16.

The injection well 20 and return well 40 may each be created by drilling into the formation 12 using any suitable drilling technique known in the art. Directional drilling techniques may be used to guide the path of each of the injection well 20 and the return well 40 from a vertical section extending from the surface 16 to a respective angular or horizontal section that traverses a length of the thermal reservoir 14. The depth of the injection well 20 may be selected to reach a level where there is sufficient heat in the formation 12 to make successful, cost effective thermal production practical. The underground temperatures effective for geothermal energy systems may range from, for example, 150 to 500 degrees Celsius. The drilling depths are generally in the range from 1,000 ft to about 30,000 ft. The types of formations suitable for geothermal energy production may vary depending on the choice of thermal transport fluid. For example, a system using supercritical CO2 may benefit from a permeability in a different range than a fluid like water. The higher the permeability in the rock formation the easier the fluid will flow but the more fluid can be lost into the formation 12.

The generator 60 may convert thermal energy of the thermal transport fluid 18 into electrical energy using any of a variety of methods known in the art apart from the specific teachings of this disclosure. For example, the thermal transport fluid 18 may be water or supercritical CO2 that is converted to steam and used to power rotation of a turbine 62. Alternatively, the thermal transport fluid 18 may be flowed through a heat exchanger to heat a secondary working fluid in a separate loop that is used to power rotation of the turbine 62. Examples of secondary working fluids include, but are not limited to, pentane, isobutane, a halogenated hydrocarbon refrigerant, liquid ammonia or another suitable Rankine-cycle working fluid. Kinetic energy of the rotating turbine 62 may then be converted to electricity by a converter unit 64. For example, the converter unit 64 may comprise a rotor and a stator that use the rotation of the turbine 62 to produce relative motion between a magnet and a conductor to generate an electromotive force (EMF) according to Faraday's law of induction. The power generated from the turbine generator 60 may be used on site or transferred to a power plant. The electricity can then be injected into an electrical grid for commercial use, for example.

A number of variables may influence the efficiency of the thermoelectric power generation. In this and other disclosed embodiments, the system 10 may help improve or optimize efficiency of the thermoelectric power cycle by dynamically controlling the flow of thermal transport fluid 18 to and from each of a plurality of injection locations and return locations in relation to temperature. The system includes a number of injection valves 22 along the injection well 20 at respective injection locations and return valves 42 along the return well 40 at respective return locations. In FIG. 1 five injection valves 22 and four return valves 42 are schematically shown by way of example, but any number of valves may be used. Temperature may also be sensed, directly or indirectly and by electronic, mechanical, fluid, or other means, at each of a plurality of temperature locations 24 along the injection well 20 and temperature locations 44 along the return well 40. Flow may then be individually controlled at each valve 22, 42 in relation to temperature. For example, each valve 22, 42 may incorporate a temperature responsive element to control flow or be in communication with a discrete temperature sensor to control flow. The system 10 may dynamically control flow at each valve 22, 42 in relation to temperature to provide increased flow to hotter regions and cooler flow to cooler regions about the thermal reservoir 14. That is, the valves control the flow in relation to temperatures proximate to the temperature responsive elements such that the flow of thermal transport fluid into the thermal reservoir is typically greatest at the hottest injection locations and flow from the thermal reservoir back into the wellbore is typically greatest at the hottest return locations.

The temperature locations 24, 44 may correspond to locations of discrete temperature sensors along the formation or wellbore. Alternatively, the temperature locations 24, 44 may correspond to locations where a fiberoptic temperature sensor senses temperature along the formation or wellbore. In other cases, such as when using a thermostatic control valve (TCV), the temperature locations 24, 44 may correspond to the locations of the respective TCVs themselves. using a temperature sensor to sense a temperature proximate each of the plurality of injection locations and return locations; and dynamically adjusting the flow at the respective injection locations and return locations in relation to the sensed temperature proximate the respective injection locations and return locations. In some installations it is beneficial to sense temperatures at temperature locations that are spaced far enough from the respective valves so that the flow of hot steam or other flow phenomenon do not adversely affect the temperature readings, introduce hysteresis issues, or other potential sources of error. The appropriate spacing may be very system-dependent. For example, in some embodiments a spacing on the order of between 50 and 150 feet apart from each of the respective injection locations and return locations may be far enough away to avoid such effects, yet close enough to give a representative indication of temperature at the respective valve. Typically, even when temperatures are sensed at a distance away from the valves, the temperature associated with a given valve is taken at a location that is closer to that valve than to other valves in the system. Other, non-distributed sensors may be utilized separately or in conjunction with fiber-optic based distributed temperature sensing (DTS) and/or distributed acoustic sensing (DAS).

In some embodiments, obtaining a temperature gradient in the vicinity of a valve may enhance temperature-based flow control. A temperature gradient may be obtained in some examples using two or more temperature sensors associated with each valve in order to determine a temperature gradient within one or more zones. For example, in one or more embodiments, three (or more) sensors per valve may be desirable in order to determine a thermal gradient in both directions from the valve, e.g., uphole towards the surface and downhole towards the toe (end) of the wellbore. Again, in other embodiments, the temperature gradient may be sensed using DTS and/or DAS. As compared with taking a single-point temperature reading at a single, discrete temperature sensor location, the use of multiple spaced-apart temperature sensors and/or distributed sensing to obtain a temperature gradient may provide a better indication of temperature behavior.

A number of downhole valve types are generally known in the art apart from the specific teachings of this disclosure, any of which may be used according to the disclosure to control flow of a thermal transport fluid from a wellbore into a thermal reservoir and from a thermal reservoir back into the wellbore. For example, a number of ICVs are available that generally have the capability of controlling flow between a formation and a wellbore. A number of TCVs are also generally know in the art having the capability of controlling flow between a formation and a wellbore. The general capabilities of these valves of controlling flow into and out of a wellbore may be used in the particular manner and configuration described in specific examples below, and variations thereof, all of which are considered within the scope of this disclosure. Thus, the systems and methods of this disclosure are not limited to the specific example configurations and valve types shown below.

Figure 2:
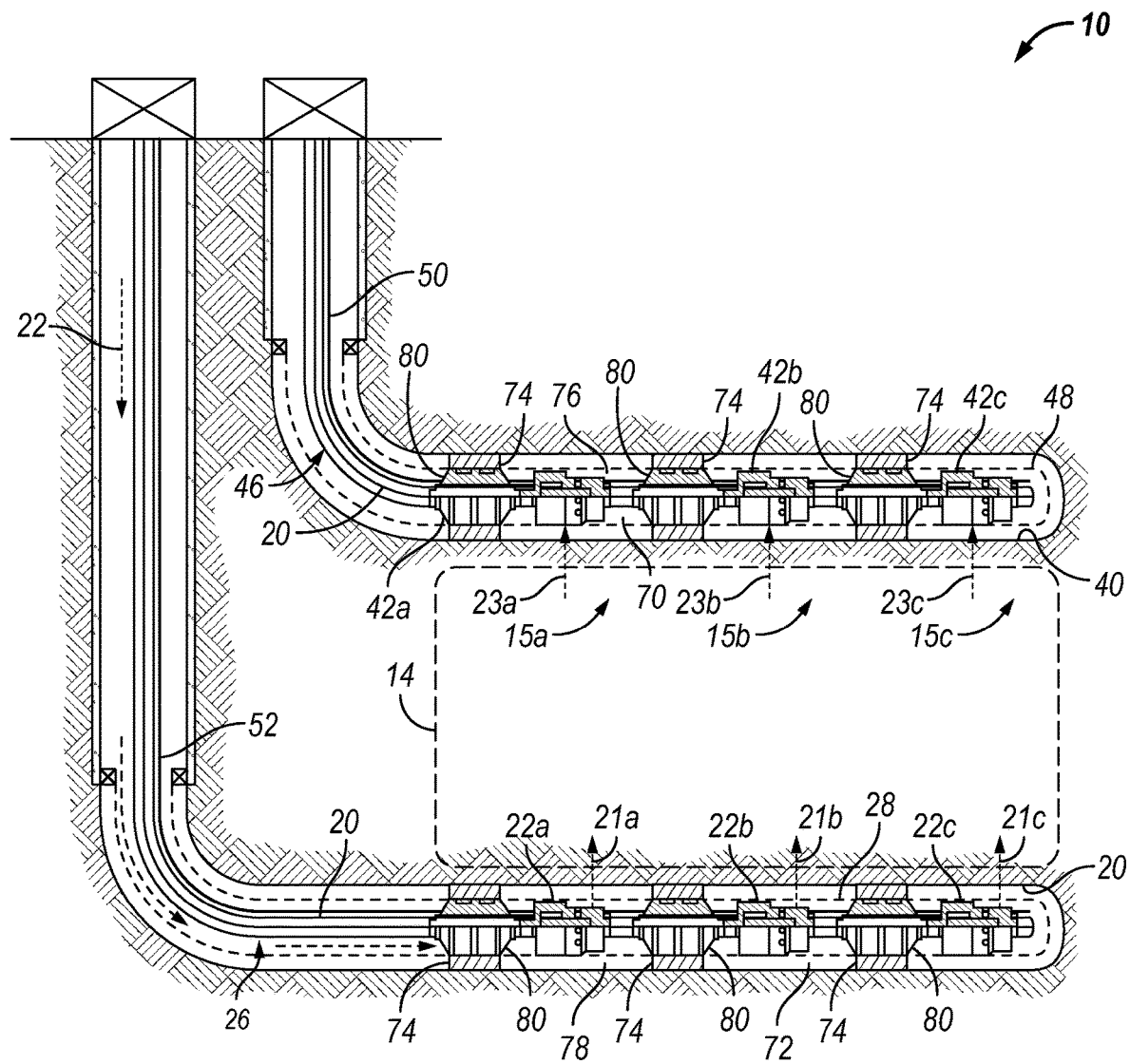
FIG. 2 is a side view of a more specific example configuration of the system generally shown in FIG. 1, with a particular arrangement of valves and optional zonal isolation.

FIG. 2 is a side view of a more specific example configuration of the system 10 generally shown in FIG. 1 including a particular arrangement of valves and optional zonal isolation. Generally, the injection well 20 and return well 40 may be spaced apart or otherwise arranged so that the thermal transport fluid injected into the thermal reservoir 14 at the injection well 20 will traverse a portion of the thermal reservoir 14 and be sufficiently heated before flowing out of the thermal reservoir 14 back into the return well 40. In the example depicted in FIG. 2, the return well 40 is directly vertically above the injection well 20, but other relative arrangements are possible in keeping with the principles of this disclosure. For example, wellbores at an angle from the vertical that allow the wellbore to intersect natural fractures in the thermal reservoir. In other instances, one, or both, of the wellbores may run parallel to the bed of the reservoir. For example if the reservoir bed/formation is inclined 10-degrees from horizontal, the one or more well bores may also be inclined 10-degrees from the horizontal. If the reservoir has a dipping bed (on a curved trajectory), the one or more wellbores may be positioned accordingly to maximize the thermal recovery, provide the most economical well bore to drill, and/or with other objectives in mind.

A set of injection valves 22 and return valves 42, individually referenced as 22a-c and 42a-c, are installed in the respective injection and return wellbores 20, 40. The injection valves 22a-c and return valves 42a-c are preferably interconnected in respective tubular strings 26, 46 which are installed in respective slotted, screened or perforated liners 28, 48 positioned in open hole portions of the respective wellbores 20, 40. Three injection valves 22a-c and three return valves 42a-c are depicted in each wellbore in FIG. 2 by way of example. However, any number of valves may be used in keeping with the principles of the invention so long as there are multiple injection valves and/or return valves spaced apart so that temperature along the respective wellbores 20, 40 can be differentiated and flow controlled accordingly. The injection valves 22a-c and return valves 42a-c may be any of the valves 12 described herein, or other suitable valves known in the art apart from the specific teachings of this disclosure.

A plurality of zones 15a-c of the formation 12 may be isolated from each other in an annulus 70 between the perforated liner 48 and the return well 40, and in an annulus 72 between the perforated liner 28 and the injection well 20, using a sealing material 74 placed in each annulus. The sealing material 74 could be any type of sealing material (such as swellable elastomer, hardenable cement, selective plugging material, etc.), or more conventional packers could be used in place of the sealing material. The zones 15a-c may also be isolated from each other in an annulus 76 between the tubular string 46 and the liner 48, and in an annulus 78 between the tubular string 26 and the liner 28, by packers 80 or another sealing material. This zonal isolation is not required in every configuration but may be included where helpful to control flow into selected zones. The zones 15a-c may also be isolated from each other in the formation by injection of a sealing or barrier material. Methods of injection plane initiation in a well may be utilized to place the sealing and/or barrier material into the preferred area.

In the well system 10, thermal transport fluid is injected into the thermal reservoir 14 at zones 15a-c of the formation 12 via the respective injection valves 22a-c in the injection well 20, and formation fluid (including the injected fluid) is received from the zones into the respective return valves 42a-c in the return well 40. Thermal transport fluid injected into the zones 15a-c is represented in FIG. 2 by respective arrows 21a-c, and thermal transport fluid produced from the zones is represented in FIG. 2 by respective arrows 23a-c.

The injection valves 22a-c and return valves 42a-c in the wellbores 20, 40 are used to control flow of thermal transport fluid into and out of the formation 12 at the respective injection and return locations. A temperature variation across the thermal reservoir 14, which may include one or more temperature taken in each zone or more particularly at temperature locations in proximity to injection and return locations may be used to individually control flow into and out of each zone. By controlling the flow into and out of the zones 15a-c according to temperature, an efficiency may be optimized.

For example, flow of the thermal transport fluid injected into a cooler zone may be choked or completely shut off, while flow to a hotter zone may be increased. As temperatures change over time, the flow at each injection and return location may be dynamically adjusted in response to temperature so that flow into and out of the thermal reservoir 14 is larger at hotter zone(s) than at cooler zones.

In one example, each injection valve 22a-22c and/or each return valve 42a-c may be a thermostatic control valve (TCV) that may individually regulate flow in response to temperature by mechanical means. As another example, a temperature variation along the wellbores 20, 40 may be monitored using individual temperature sensors, or a fiber optic line 52 in the injection well 20 and/or a fiber optic line 50 in the production well 40. Each fiber optic line 50, 52 may be queried at different locations along its length to determine a temperature at several locations. Signals from the temperature sensors and/or or fiber optic lines may be input to a control module of each valve, so that each valve appropriately adjusts its associated flow relative to the other valves. In some embodiments, a control module may control one or more valves. In some embodiments, one or more control modules may be placed at the surface. In one or more embodiments the control modules may be downhole, uphole, near the wells and/or at a location far from the wells.

Figure 3:
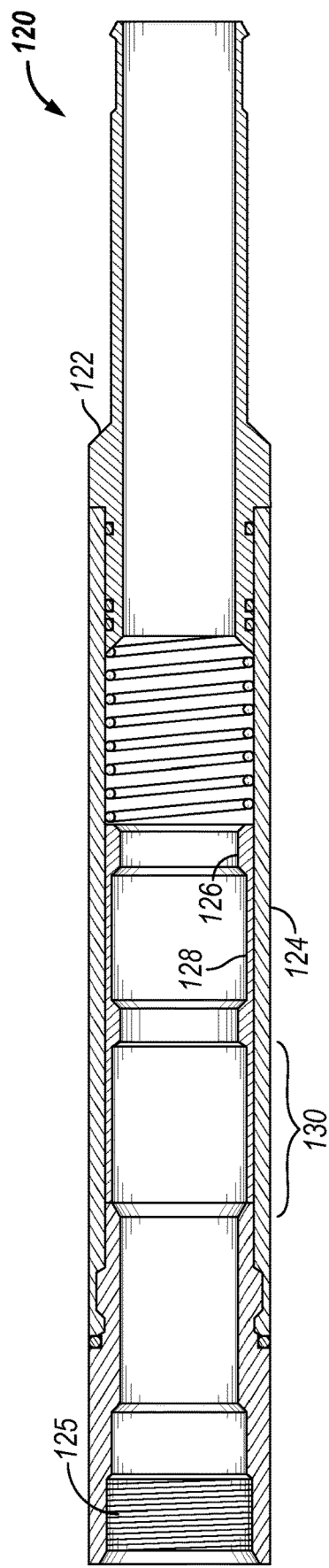
FIG. 3 is a side view of an example of a thermostatic control valve (TCV) that mechanically and autonomously controls flow in relation to temperature.

FIG. 3 is a side view of an example of a thermostatic control valve (TCV) 120 suitable for use with this disclosure that opens and closes mechanically and autonomously in relation to temperature. The TCV 120 is an example of a temperature-responsive valve for dynamically controlling the flow of the thermal transport fluid in relation to a temperature at the respective injection locations and/or return locations. The TCV 120 in this example regulates flow in relation to temperature using mechanical means and can be configured for use as either an injection valve or as a return valve. The TCV 120 is shown in a closed state in FIG. 3. The TCV valve comprises a valve body 122 with a valve body port 124 (which may be a plurality of circumferentially spaced ports) for flow to or from an annulus about the valve body 122. The valve body 122 may be fluidically coupled in line with a tubing string via a threaded connection 125 or the like. A sleeve 126 is disposed within the valve body 122 and is axially moveable within the valve body 122 to open or close the valve body port 124. The sleeve 126 also include a sleeve port 128 that may be aligned or misaligned with the valve body port 124 to open and close the TCV 120 respectively. In FIG. 3, the sleeve port 128 is misaligned to the right of the valve body port 124, so that flow is closed between the annulus about the TCV 120 and the interior of the TCV 120. A mechanical expansion chamber 130 (which may comprise multiple expansion chambers arranged in series) is coupled to the sleeve 126. The expansion chamber 130 expands or contract in response to increasing or decreasing temperature to urge the sleeve 126 to alternately open and close the valve body port 124. With the TCV 120 closed, flow is constrained to flow through the valve body 122 without entering or exiting the valve body port 124.

Again, valve-selection may be discretionary based on the type of well and the operator preferences. In some operations, for example, an operator may elect to go with TCVs only on the production side of the operation. In other operations, TCVs may be elected to be used only on the injection side of operations. In other embodiments, TCVs may places in only one local (zones) on the injection and/or production side of the well or wells. For example, one or more TCVs may be placed in only the most permeable zones of the one or more wells. In other embodiments, it may be preferred to use one or more TCVs to regulate only the flow into a geothermal well, a geothermal zone. In other embodiments, one or more TCVs may be used in one of a series of multilateral wells, of one or more wellbores in a geothermal system of wellbores.

Figure 4:
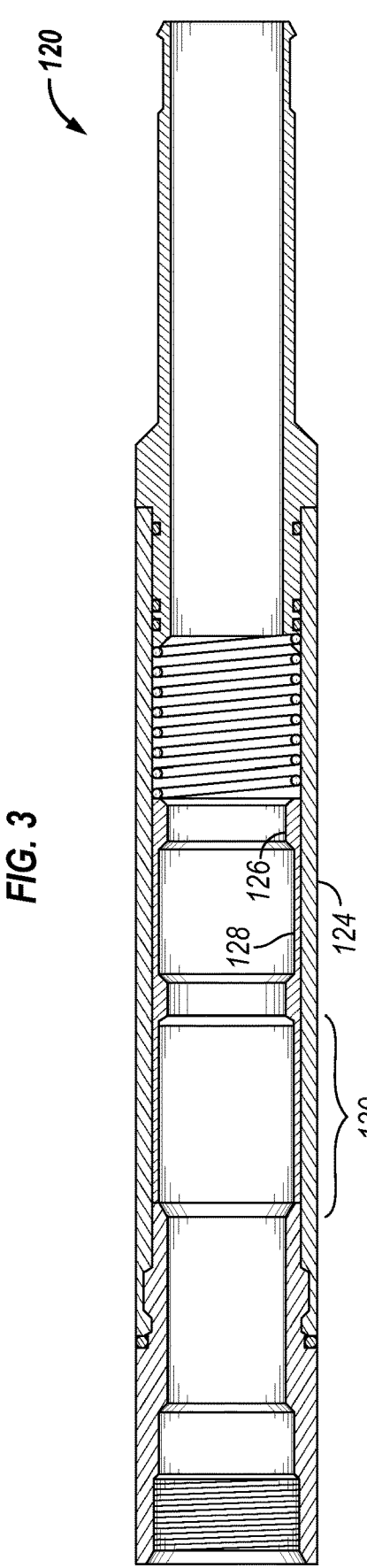
FIG. 4 is a side of the TCV, wherein the sleeve has been shifted by an expansion chamber from a closed position to an open position in response to a temperature increase.

FIG. 4 is a side of the TCV 120 of FIG. 3, wherein the sleeve 126 has been shifted to an open position in response to a temperature increase. In particular, an expansion chamber 130 has increased in volume in response to the temperature increase, urging the sleeve 126 to the right, such that the sleeve port 128 now aligns with the valve body port 124. The thermal transport fluid flows out through the aligned ports 124, 128, as in the example of using the TCV as an injection valve. Alternatively, such a TCV could be configured to allow a fluid to be injected into a formation when the ports are so aligned. As illustrated by example in FIGS. 3 and 4, such a TCV is optionally capable of controlling flow in relation to temperature using mechanical means and without necessarily having any electronic input. Alternatively, however, a valve with a sliding sleeve mechanism or other such mechanism could be configured to be controlled with an electronic controller that would sense temperature and control position of the sleeve in response to temperature.

Figure 5:
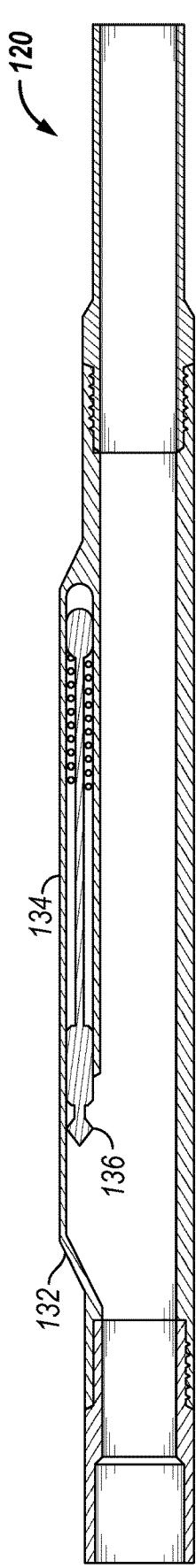
FIG. 5 is a side view of the TCV with an optional side pocket mandrel for housing controller components.

FIG. 5 is a side view of the TCV 120 of FIGS. 3 and 4 configured with an optional side pocket mandrel. The side pocket mandrel comprises a mandrel 132 (which may be part of a valve body) with a side pocket 134 for holding a control unit 136 for operating the TCV 120. The control unit 136 may comprise the mechanism or a portion thereof, e.g., the sleeve itself and/or the expansion chambers, that controls the position of the sleeve or other moveable valve element within the TCV 120 in response to temperature. Alternatively, another type of valve may be configured so that the side pocket 134 may house an electronic module for controlling the opening and closing of that valve. Positioning the control unit 136 in the side pocket 134 provides for accessibility to the control unit 136 and other components. In other embodiments, the control unit 136 and/or sleeve port 128 may be made retrievable via wireline, coiled tubing or other systems/methods. This way control unit, 136 and sleeve port 128, for example, can be replaced which is advantageous because they are the components which are more likely to fail due to wear, corrosion, temperature degradation, erosion, etc. By utilizing a side pocket mandrel, components such as control unit, 136 and sleeve port 128, seals, sealing devices, (not shown) between sleeve port 128 and valve body port 124 may be replaced without withdrawing the tubing string, such as tubular strings 26, 46, from a well.

Further, the control unit 136 can be retrieved from a wellbore for repairs, maintenance, replacement, and/or a set point change. The control unit may be removed and replaced with another control unit, if desired, by lowering a tool deployed on wireline or coiled tubing into the wellbore through the delivery conduit. A tool shaped to fit around the end of the control unit could be used to hold the control unit as it is being retrieved from or lowered into the wellbore. Fiber optic cable could be placed along the wellbore on the outside of the fluid (e.g., steam) line to detect the temperature along the entire length of the wellbore. Alternatively, temperature sensors could be placed along the wellbore. Such temperature monitoring methods could be used to indicate when a brain needs to be replaced with another one having different set points.

The foregoing discussion provides some examples of system configurations and elements thereof, including examples of valves and other system components suitable for controlling flow into or out of a thermal reservoir responsive to temperature. These and other systems may comprise mechanical or electromechanical components. Generalized control systems and control logic will now be discussed in relation to FIGS. 6 and 7 that may be applied to any of a variety of system embodiments using mechanical or electromechanical control functionality.

Figure 6:
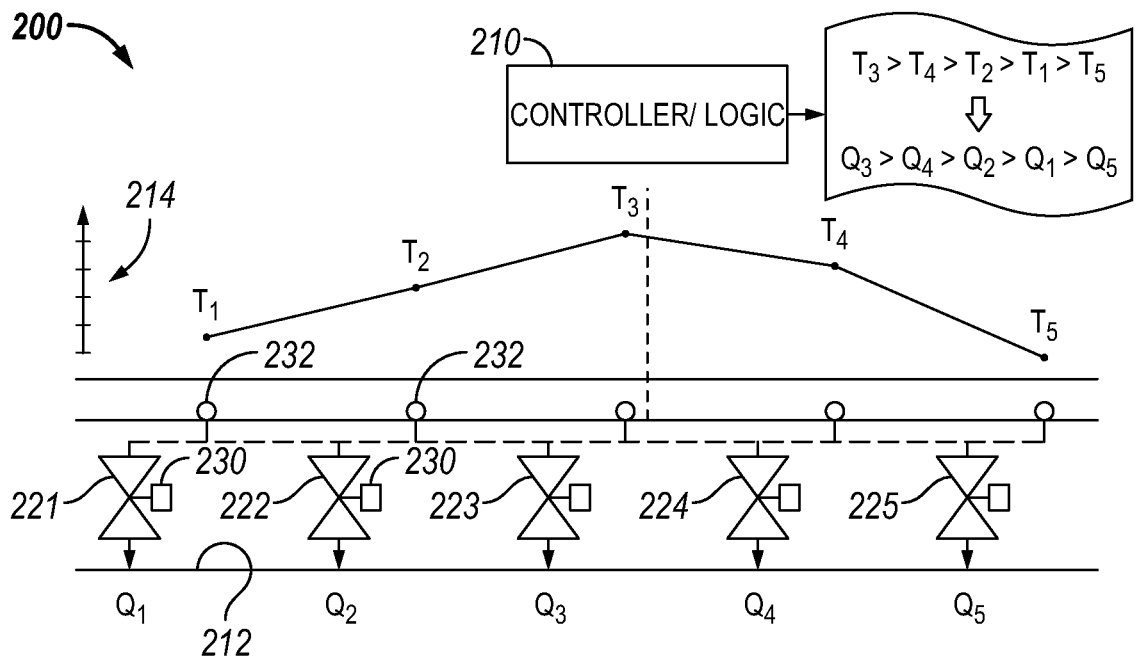
FIG. 6 is a schematic diagram of a system having a controller for controlling a plurality of valves in relation to temperature.

FIG. 6 is a schematic diagram of a system 20 having a controller 210 for controlling a plurality of valves 221-225 in relation to temperature. It should be recognized, for temperature control, the Combined Gas Law may apply, which describes a relationship between temperature, pressure and volume. Therefore, it is understood when discussing the controlling of temperature this may entail not only the control of temperature directly, but may also take into consideration the control of pressure and volume. Since volume of a thermal reservoir may be variable, the control of pressure and temperature is especially inter-related within the scope of this disclosure. The controller 210 may include a central controller located at surface or downhole in communication with the plurality of valves 221-225. Alternatively, a distributed controller may comprise individual controllers 230 included with each valve 221-225, in addition or in lieu of the central controller 210. Such individual controllers 230 could operate autonomously in relation to local temperatures sensed. Alternatively, such individual controllers 230 could cooperate with the central controller 210 to implement a control logic for controlling the valves in relation to temperature.

In any configuration, the valves 221-225 are spaced apart along a wellbore 212 with sufficient spacing that temperature may vary appreciably along a portion of the wellbore 212 spanning the valves 221-225. A temperature T1 through T5 is indicated for each of the respective valves 221-225. A temperature profile 214 is superimposed on the figure to graphically indicate how temperature varies from valve to valve 221-225. In this example, at a moment in time, temperature T3 in proximity to the third valve 223 is the hottest temperature and temperature T5 in proximity to the fifth valve 225 is the coolest temperature. The flow Q1 through Q5 is individually adjusted at each valve according to temperature. Thus, for example, the flow Q3 at the third valve 223 may be highest flow of the five valves 221-225, and the flow Q5 at the fifth valve 225 may be the lowest of the five valves 221-225. In some cases, one or more valves at the lower end of the temperature profile 214 may have their flow on a minimum setting, which may be completely shut off, while valves at the upper end of the temperature profile 214 may have their flow at or near a maximum setting. The valves that are neither at the highest or lowest temperature locations may have their flow settings individually adjusted somewhere at or above the flow of the lowest flow setting (Q5) and at or below the flow of the highest flow setting (Q3).

In some cases, the valves 221-225 may be individually adjustable to one of a plurality of discrete flow settings such as fully on, fully off, and optionally one or more flow settings between fully on and fully off. In other examples, each valve may have an "infinite" adjustability between fully on and fully off. In cases where the valves have multiple or infinite adjustability, the controller 210 may control flow with sufficient granularity that each valve may have a different flow rate at any given point in time based on there being a different temperature proximate every valve. In other cases, where a valve is only switchable between fully on and fully off, then the valves may just be switched on or off depending on whether they are toward an upper end of the temperature profile 214 (ON) or toward a lower end of the temperature profile 214 (OFF).

In some cases, the valves 221-225 may be autonomous, and individually control their own flow rates responsive to temperature without communication with the other valves and without knowing what temperatures are in proximity to the other valves. For example, a mechanical TCV such as discussed in relation to FIGS. 3 and 4 above may be pre-configured to turn on or off or adjust flow responsive to temperature based on mechanical expansion of a chamber, without explicitly measuring a temperature. In that case, each valve 221-225 may be preconfigured to open/close or vary a flow rate in response to temperature so that any given valve in a given temperature range will respond similarly, and so that valves above a certain temperature will have greater flow than valves below that temperature.

Alternatively, each valve may have a local controller 230 that either senses temperature locally or is in electronic communication with an optional discrete temperature sensor or fiber optic temperature sensor, to electronically adjust flow rate in response to temperature. Again, this can be an autonomous flow control, without necessarily communicating with other valves or with a central controller 210. In that case, the individual controllers 230 of each valve 221-225 may be preconfigured to open/close or vary a flow rate in response to temperature so that any given valve in a given temperature range will respond similarly, and so that valves above a certain temperature will have greater flow than valves below that temperature.

Yet another alternative uses the central controller 210, remotely located from the valves (e.g., at surface or somewhere else downhole) to implement the control logic. In that case, the central controller 210 may be in communication with the optional discrete temperature sensors 232 or a fiber optic continuous temperature sensor to obtain the temperatures T1-T5, and dynamically adjust the flow rates of the respective valves 221-225, so that flow generally increases with increasing temperature. In some cases, flow may be individually controlled at each valve with sufficient granularity that each valve is at a different flow rate than other valves at different temperatures. In other cases, even if the flow control is less granular, any given valve at a higher temperature is at the same or greater flow rate than another valve at a lower temperature. Exceptions may occur temporarily, such as if the temperature profile 214 changes and there is a lag in adjusting the various valves, which may result in a temporary situation where a valve at a hotter location is at a lower flow rate than a valve at a cooler location.

Another optional feature is to normally use the controller 210 to automatically generate command signals responsive to the temperature proximate each of a plurality of injection locations and return locations for individually controlling the flow of the thermal transport fluid at the respective injection locations and return locations. Then, the controller 210 and command signals can be selectively overridden with manual control signals, such as at a surface of a wellsite, to allow an operator to instead manually control the flow at the respective injection locations and return locations.

In some embodiments, the valves may be manually adjusted such as by tripping a wireline or other conveyance downhole to manually adjust a desired valve, or to replace the valve or change out components to change the flow rate, in relation to temperatures sensed at the surface. Such embodiments may be useful with installations where the temperatures are relative static and changes are infrequent.

Thus, a method of producing geothermal energy may include flowing a thermal transport fluid into a wellbore traversing a thermal reservoir of a formation. A flow of the thermal transport fluid from the wellbore into the thermal reservoir may be dynamically controlled at each of a plurality of injection locations along the wellbore such that the flow is greater at the injection locations where the temperature is hotter. A flow of the thermal transport fluid from the thermal reservoir into the wellbore may also be dynamically controlled at each of a plurality of return locations along the wellbore such that the flow is greater at the return locations where the temperature is hotter. The thermal transport fluid from the return locations may then be provided to an electric generator to generate electric energy. In any of the foregoing examples, flow is generally increased to hotter injection locations and return locations (and, correspondingly, decreased to cooler injection and return locations). By directing more flow of thermal transport fluid into and out of the hottest locations of the formation, the efficiency of the thermoelectric cycle may be optimized.

Figure 7:
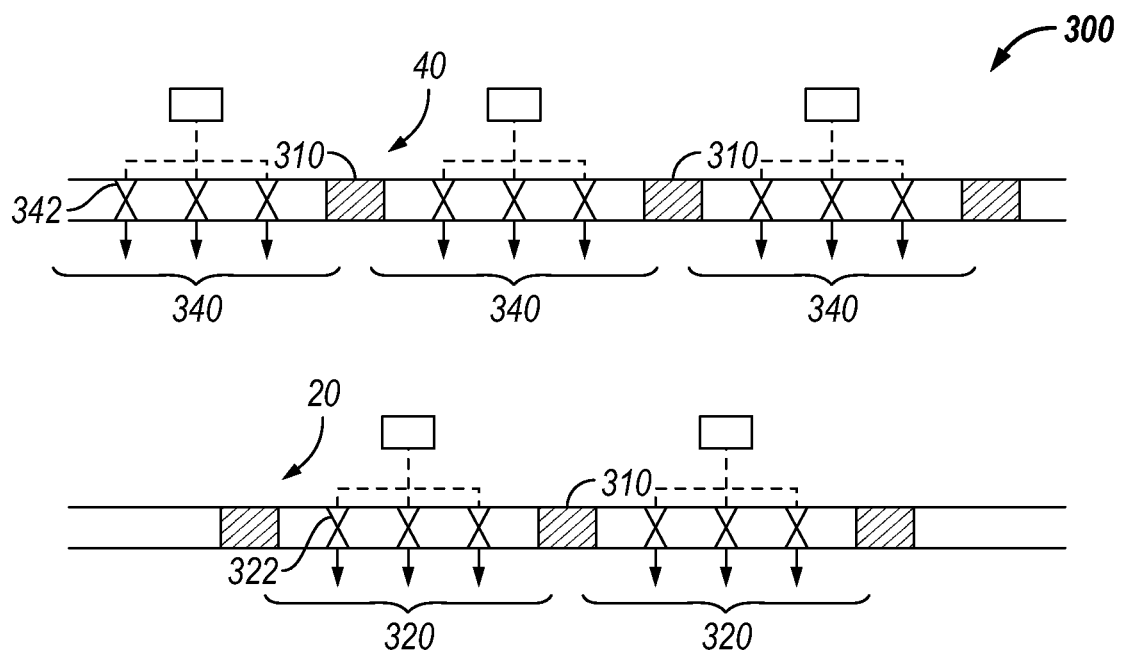
FIG. 7 is a schematic diagram of another example system providing temperature-based flow control at a plurality of locations within each of a plurality of zones.

FIG. 7 is a schematic diagram of another example system providing temperature-based flow control at a plurality of locations within each of a plurality of zones along the wellbore. In this example, the injection well 20 is organized into two zones 320, and the return well 40 is organized into three zones 340, although any number of zones 320 and/or 340 could be created. The zones are pressure-isolated from one another with a suitable sealing element 310 such as a plug or packer on each side of each zone, including between adjacent zones. Each zone comprises two or more of the injection locations where injection valves 322 are positioned and two or more return locations where return valves 342 are positioned.

Each zone may be managed independently of other zones, to individually control flow through the valves in that zone in relation to temperature proximate the injection and return locations. For example, each zone may be operated according to the general principles of the system 200 of FIG. 6. Within each zone 320 along the injection well 20, flow is individually controlled from the wellbore 20 into a thermal reservoir at each of the injection locations corresponding to the injection valves 322 in that zone, such that the flow is greater at the injection locations where the temperature is hotter within that zone 320. Likewise, within each zone 340 along the return well 40, the flow from the thermal reservoir into the wellbore at each of the return locations corresponding to the return valves 342 in that zone is controlled such that the flow is greater at the return locations where the temperature is hotter within that zone 340.

In some of the foregoing examples, a separate injection well and return well are provided. The injection and return wells may be entirely separate wells in some examples. In other examples, the injection and return wells may be separate branches of a multilateral well.

Figure 8:
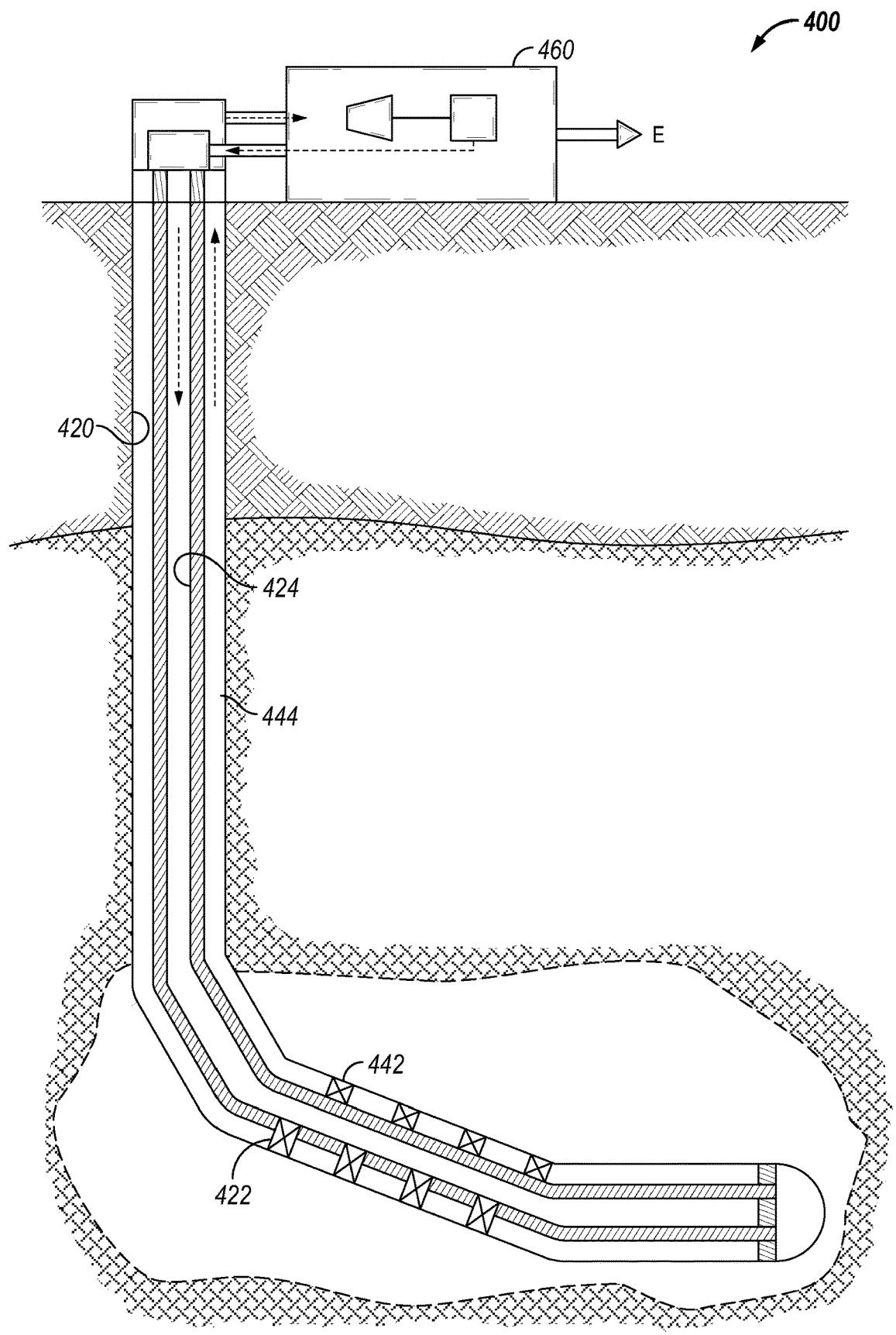
FIG. 8 is an elevation view of a geothermal energy production system according to another example configuration, wherein the injection and return locations are along the same well.

FIG. 8 is an elevation view of a geothermal energy production system 10 according to another example configuration, wherein the injection and return locations are along the same well 420. The plurality of return locations where return valves 442 are positioned are along the same wellbore as the injection locations where the injection valves 422 are positioned. Thus, a first wellbore portion spanning the plurality of injection locations is coextensive with a second wellbore portion spanning the plurality of return locations (rather than in separate wells or separate wellbore branches).

To achieve this, the well 420 includes separate injection and return flowpaths isolated from one another. In particular, an injection conduit 424 is disposed along the wellbore in fluid communication with the plurality of injection valves 422. The injection conduit may be an inner tubing string, for instance. A return conduit 444 is also provide along the wellbore in fluid communication with the plurality of return valves 442. The return conduit 444 may be, for instance an annulus between the wellbore and the injection conduit 424. An insulation is provided between the injection conduit 424 and the return conduit 444, so that cooler fluid being injected into the well 420 via the injection conduit 424 is insulated from the hotter fluid in the return conduit 444 that is used to drive thermoelectric power generation at the generator 460.

Those of ordinary skill in the art in possession of this disclosure will appreciate that other well configurations are also within the scope of this disclosure aside from the example wellbore arrangements and flow paths discussed herein. In some embodiments the hotter fluid in a return conduit may be used for other purposes beside thermoelectric power generation. As examples, the hotter fluid may be used for heating a building, a green house, or for manufacturing processes which require heat such as mixing of chemicals at elevated temperatures, etc. Further, in some embodiments, other components or areas of the well may be insulated to reduce heat loss and increase thermal efficiency, etc. In some embodiments, the portion of the well above the geothermal reservoir may be insulated so the heat is not transferred out of well and into the surrounding wellbore, formation, water reservoirs, etc.

Accordingly, the present disclosure may provide flow control into and out of a geothermal reservoir for extraction of energy at surface. A non-limiting example application of such flow optimization includes thermoelectric power generation that optimizes efficiency and/or power output by virtue of controlling flow in response to temperature or temperature related parameters. The methods/systems/compositions/tools may include any of the various features disclosed herein, including one or more of the following statements.

Statement 1. A method, comprising: flowing a thermal transport fluid from a surface location to a geothermal reservoir along an injection flow path of a wellbore; flowing the thermal transport fluid into the geothermal reservoir at each of a plurality of injection locations along the injection flow path; flowing the thermal transport fluid from the geothermal reservoir into a return flow path of the wellbore at each of a plurality of return locations; flowing the thermal transport fluid along the return flow path back to surface; extracting thermal energy from the thermal transport fluid from the return flow path before flowing the thermal transport fluid back into the injection flow path of the wellbore; and dynamically controlling flow into or out of the geothermal reservoir in response to one or more downhole parameters of the thermal transport fluid.

Statement 2. The method of Statement 1, wherein extracting thermal energy from the thermal transport fluid comprises using the thermal energy to drive an electric generator.

Statement 3. The method of any of Statements 1 or 2, wherein dynamically controlling flow into or out of the geothermal reservoir in response to one or more downhole parameters of the thermal transport fluid comprises increasing a flow rate of the thermal transport fluid to or from hotter locations of the geothermal reservoir.

Statement 4. The method of Statement 3, further comprising: using valves for dynamically controlling the flow of the thermal transport fluid in relation to the one or more downhole parameters at the respective injection locations and/or return locations.

Statement 5. The method of any of Statements 1 to 4, further comprising: sensing one or more temperature along the wellbore to identify injection locations or return locations where temperature is hotter; and dynamically adjusting the flow at the respective injection locations or return locations in relation to the one or more downhole parameters.

Statement 6. The method of any of Statements 1 to 5, further comprising sensing the one or more downhole parameters with a fiber-optic sensor along a portion of the wellbore spanning one or both of the plurality of injection locations and the plurality of return locations.

Statement 7. The method of any of Statements 1 to 6, wherein the injection flow path and the return flow path are along different wellbores.

Statement 8. The method of any of Statements 1 to 7, wherein the injection flow path and the return flow path are along the same wellbore.

Statement 9. The method of any of Statements 1 to 8, further comprising: automatically generating command signals, responsive to the one or more downhole parameters proximate each of a plurality of injection locations or return locations for individually controlling the flow of the thermal transport fluid at the respective injection locations and return locations.

Statement 10. The method of Statement 9, further comprising: selectively overriding the automatically generated command signals with manual control signals at a surface of a wellsite to instead manually control the flow at the respective injection locations and return locations.

Statement 11. The method of any of Statements 1 to 10, further comprising: pressure-isolating a plurality of zones along the wellbore, wherein each zone comprises two or more of the injection locations or two or more of the return locations; within each zone, individually controlling the flow of the thermal transport fluid from the wellbore into the thermal reservoir at each of the injection locations in that zone in response to the one or more downhole parameters of the thermal transport fluid; and within each zone, individually controlling the flow of the thermal transport fluid from the thermal reservoir into the wellbore at each of the return locations in that zone in response to the one or more downhole parameters of the thermal transport fluid.

Statement 12. A geothermal energy extraction system, comprising: a wellbore in fluid communication with a geothermal reservoir at a plurality of injection locations and/or return locations; a valve at each injection location for controlling a flow of a thermal transport fluid from the wellbore into the geothermal reservoir and/or a valve at each return location for controlling a flow of the thermal transport fluid from the geothermal reservoir into the wellbore; and wherein the valves control the flow in relation to one or more downhole parameters proximate to the valves.

Statement 13. The geothermal energy extraction system of Statement 12, wherein the valves control the flow of thermal transport fluid such that the flow is greater at hotter injection locations and at hotter return locations.

Statement 14. The geothermal energy extraction system of Statement 12 or 13, further comprising: a power generator to generate power from the thermal transport fluid received from the return locations.

Statement 15. The geothermal energy production system of any of Statements 11 to 14, wherein each valve comprises a port, a sleeve axially moveable to open or close the port, and an expansion chamber coupled to the sleeve that expands in response to increasing temperature to urge the sleeve to open the port.

Statement 16. The geothermal energy production system of any of Statements 11 to 15, wherein each valve comprises a controller for regulating the flow of thermal transport fluid through the valve and a side pocket for holding the controller.

Statement 17. The geothermal energy production system of any of Statements 11 to 16, further comprising: a sensing system for sensing the one or more downhole parameters at a plurality of locations along the wellbore; and a controller in communication with the valves and sensing system and configured for adjusting each valve according to the one or more downhole parameters sensed at a nearest of the temperature locations.

Statement 18. The geothermal energy production system of Statement 17, wherein the controller comprises a local controller at each valve and a central controller in communication with all of the local controllers.

Statement 19. The geothermal energy production system of Statement 17 or 18, further comprising: a plurality of zones along the wellbore pressure-isolated with sealing material, wherein each zone comprises a plurality of the injection locations and/or a plurality of the return locations; and wherein the controller is configured for adjusting the valves in each zone in relation to temperatures in proximity to the valves within that zone, such that the flow of thermal transport fluid is greater at some of the injection locations and at some of the hotter return locations within each zone.

Statement 20. The geothermal energy production system of any of Statements 11 to 19, wherein the thermal transport fluid comprises supercritical CO2.

To facilitate a better understanding of the present invention, the following examples of certain aspects of some embodiments are given. In no way should the following examples be read to limit, or define, the entire scope of the disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method, comprising:
   flowing a thermal transport fluid from a surface location to a geothermal reservoir along an injection flow path of a wellbore;
   flowing the thermal transport fluid into the geothermal reservoir at each of a plurality of injection locations along the injection flow path;
   flowing the thermal transport fluid from the geothermal reservoir into a return flow path of the wellbore at each of a plurality of return locations;
   flowing the thermal transport fluid along the return flow path back to surface;
   extracting thermal energy from the thermal transport fluid from the return flow path before flowing the thermal transport fluid back into the injection flow path of the wellbore; and
   dynamically controlling a flow of the thermal transport fluid into or out of the geothermal reservoir in response to one or more downhole parameters of the thermal transport fluid and/or of the geothermal reservoir,
   wherein dynamically controlling the flow of the thermal transport fluid comprises:
      sensing the one or more downhole parameters at a plurality of sensor locations along the wellbore, wherein each sensor location, of the plurality of sensor locations, is spaced far enough from a respective one of the plurality of injection locations or plurality of return locations that the flow does not directly affect the one or more downhole parameters; and
      dynamically adjusting the flow of the thermal transport fluid, respectively, at the plurality of injection locations or the plurality of return locations in relation to the one or more downhole parameters.

2. The method of claim 1, wherein the plurality of sensor locations are between 50 and 150 feet away, respectively, from the plurality of injection locations or the plurality of return locations.

3. The method of claim 1, wherein the one or more downhole parameters comprise a plurality of temperatures.

4. The method of claim 3, further comprising:
   sensing one or more of the downhole parameters with a fiber-optic sensor along a portion of the wellbore spanning one or both of the plurality of injection locations and the plurality of return locations.

5. The method of claim 3, further comprising:
sensing the plurality of temperatures using discrete temperature sensors.

6. The method of claim 3, further comprising:
sensing the plurality of temperatures using a combination of discrete sensors and distributed sensors.

7. The method of claim 1, further comprising:
automatically generating command signals, responsive to the one or more downhole parameters proximate to each of the plurality of injection locations or the plurality of return locations,
wherein the command signals individually control the flow of the thermal transport fluid, respectively, at the plurality of injection locations and/or the plurality of return locations.

8. The method of claim 7, further comprising:
selectively overriding the automatically generated command signals with manual control signals at a surface of a wellsite to manually control the flow of the thermal transport fluid, respectively, at the plurality of injection locations and/or the plurality of return locations.

9. The method of claim 1, further comprising:
pressure-isolating a plurality of zones along the wellbore, wherein each zone comprises two or more of the injection locations or two or more of the return locations;
within each zone, individually controlling the flow of the thermal transport fluid from the wellbore into the geothermal reservoir at each of the injection locations in that zone in response to the one or more downhole parameters; and
within each zone, individually controlling the flow of the thermal transport fluid from the geothermal reservoir into the wellbore at each of the return locations in that zone in response to the one or more downhole parameters.

10. The method of claim 1, wherein the one or more downhole parameters comprises at least one selected from the group consisting of:
temperature, pressure, volume, heat, velocity, isothermal changes, isobaric changes, isochoric changes, phase change, and acoustic vibration.

11. A geothermal energy extraction system, comprising:
a wellbore in fluid communication with a geothermal reservoir at a plurality of injection locations and/or a plurality of return locations;
a plurality of valves, wherein the plurality of valves is at least one selected from the group consisting of:
a plurality of injection valves at each injection location, respectively, for controlling a flow of a thermal transport fluid from the wellbore into the geothermal reservoir; and
a plurality of return valves at each return location, respectively, for controlling the flow of the thermal transport fluid from the geothermal reservoir into the wellbore,
wherein the plurality of valves control the flow in relation to one or more downhole parameters relative to the plurality of valves;
a sensing system comprising sensors for sensing the one or more downhole parameters at a plurality of sensor locations along the wellbore, each sensor location spaced far enough from a respective one of the plurality of valves that the flow through that valve does not directly affect the one or more downhole parameters;
a controller for dynamically adjusting the flow, respectively, at the plurality of injection locations or the plurality of return locations in relation to the one or more downhole parameters; and
a power generator to generate power from the thermal transport fluid received from the return locations.

12. The geothermal energy extraction system of claim 11, wherein the plurality of sensor locations are between 50 and 150 feet away, respectively, from the plurality of injection locations or the plurality of return locations.

13. The geothermal energy extraction system of claim 11, wherein the one or more downhole parameters comprise a plurality of temperatures.

14. The geothermal energy extraction system of claim 13, wherein the sensors comprise discrete temperature sensors for sensing the plurality of temperatures.

15. The geothermal energy extraction system of claim 13, wherein the sensors comprise one or more distributed temperature sensors for sensing the plurality of temperatures.

16. The geothermal energy extraction system of claim 13, wherein the sensors comprise a combination of discrete and distributed sensors.

17. The geothermal energy extraction system of claim 11, further comprising:
a tubing string disposed along the wellbore,
wherein an injection flow is defined along an interior of the tubing string in fluid communication with the plurality of injection valves, and
wherein a return flow is defined along an annulus between the wellbore and the tubing string in fluid communication with the plurality of return valves.

18. The geothermal energy extraction system of claim 11, wherein the one or more downhole parameters comprises at least one selected from the group consisting of:
temperature, pressure, volume, heat, velocity, isothermal changes, isobaric changes, isochoric changes, phase change, and acoustic vibration.

19. The geothermal energy extraction system of claim 11, further comprising:
a plurality of temperature sensors located in a vicinity of a valve of the plurality of valves,
wherein the plurality of temperature sensors is configured to obtain a first temperature gradient for the vicinity.

20. The geothermal energy extraction system of claim 19, wherein the plurality of temperature sensors are further configured to obtain a second temperature gradient for the vicinity,
wherein the first temperature gradient is an uphole direction from the valve, and
wherein the second temperature gradient is a downhole direction from the valve.

* * * * *